(12) United States Patent
Kallsen

(10) Patent No.: US 8,122,611 B1
(45) Date of Patent: Feb. 28, 2012

(54) JIG DEVICE

(76) Inventor: Dennis J. Kallsen, Kankakee, IL (US)

(*) Notice: Subject to any disclaimer, the term of this patent is extended or adjusted under 35 U.S.C. 154(b) by 35 days.

(21) Appl. No.: 12/806,318

(22) Filed: Aug. 10, 2010

Related U.S. Application Data

(60) Provisional application No. 61/273,958, filed on Aug. 11, 2009.

(51) Int. Cl.
*B43L 7/10* (2006.01)

(52) U.S. Cl. .............................. 33/526; 33/462

(58) Field of Classification Search .............. 33/526, 33/416–427, 451, 452, 456–465, 534, 474, 33/478

See application file for complete search history.

(56) References Cited

U.S. PATENT DOCUMENTS

| | | | | |
|---|---|---|---|---|
| 116,163 | A | * | 6/1871 | Crupper ........................ 33/457 |
| 523,398 | A | * | 7/1894 | Gorman ........................ 33/419 |

(Continued)

*Primary Examiner* — Yaritza Guadalupe-McCall
(74) *Attorney, Agent, or Firm* — Emery L. Tracy

(57) ABSTRACT

A jig device for accurately measuring an opening when installing shelving, windowsills, molding, and similar construction material is provided. The jig device comprises a first elongated bar and a second elongated bar. First incremental measurements are marked on the first elongated bar with the first incremental markings reading right to left. Second incremental measurements are marked on the second elongated bar with the second incremental markings reading left to right. A first fastening mechanism slidably connects the first elongated bar to the second elongated bar and is tightenable to inhibit movement between the first elongated bar and the second elongated bar. A first angle paddle and a second angle paddle are provided. A second fastening mechanism slidably and rotatably connects the first angle paddle to the first elongated bar and is tightenable to inhibit movement between the first angle paddle and the first elongated bar and a third fastening mechanism slidably and rotatably connects the second angle paddle to the second elongated bar and is tightenable to inhibit movement between the second angle paddle and the second elongated bar. Upon positioning the jig device within an opening with the second sides of the angle paddles rotated and moved along the second and third fastening means and positioned on the outside of the opening, the alignment of a common number on the first incremental measurements and the second incremental measurements indicates a center point for the opening.

19 Claims, 3 Drawing Sheets

U.S. PATENT DOCUMENTS

| | | | | |
|---|---|---|---|---|
| 614,259 | A | * | 11/1898 | Bouldry ............................ 33/419 |
| 759,319 | A | * | 5/1904 | Schumacher .................... 33/461 |
| 847,720 | A | * | 3/1907 | Barbo .............................. 33/462 |
| 1,238,536 | A | * | 8/1917 | Linn ................................ 33/419 |
| 1,349,348 | A | * | 8/1920 | Thielman ........................ 33/461 |
| 1,622,158 | A | * | 3/1927 | Liberty ............................ 33/462 |
| 3,991,474 | A | * | 11/1976 | Rath ................................ 33/462 |
| 4,637,143 | A | * | 1/1987 | Telles .............................. 33/457 |
| 4,813,149 | A | | 3/1989 | Herkimer |
| 4,882,846 | A | * | 11/1989 | Reed ................................ 33/464 |
| D305,873 | S | * | 2/1990 | Bisson ............................ D10/62 |
| 5,205,045 | A | | 4/1993 | Liu |
| 5,440,818 | A | | 8/1995 | Mailhot |
| 5,634,279 | A | | 6/1997 | Ariyo |
| 7,159,328 | B1 | * | 1/2007 | Duda .............................. 33/647 |
| 7,269,909 | B1 | * | 9/2007 | Barbieri .......................... 33/419 |
| 2002/0170189 | A1 | * | 11/2002 | Cheatham ...................... 33/194 |
| 2005/0115091 | A1 | * | 6/2005 | Harris ............................ 33/461 |

* cited by examiner

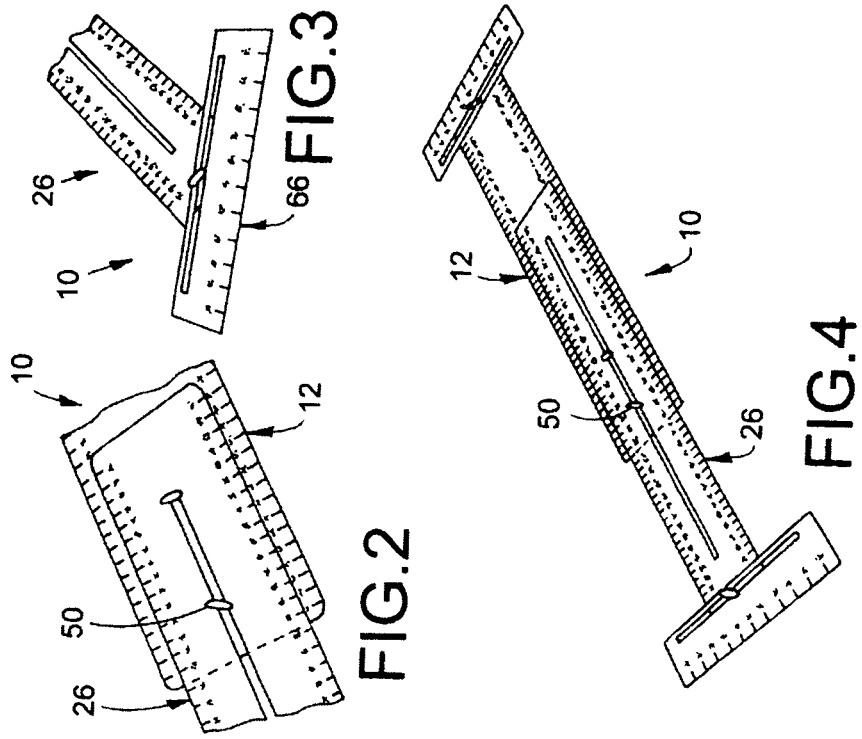
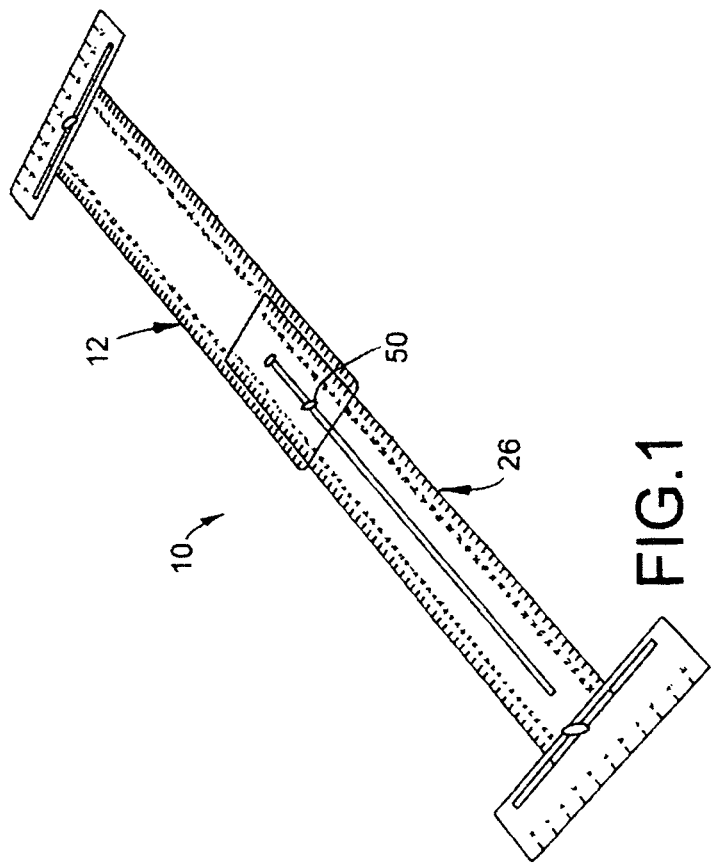

JIG DEVICE

The present application claims the benefit of priority of pending provisional patent application Ser. No. 61/273,958, filed on Aug. 11, 2009, entitled "Jig".

BACKGROUND OF THE INVENTION

1. Field of the Invention

This invention relates generally to a jig device and, more particularly, the invention relates to a jig device for use in when installing shelving, windowsills, molding, or similar construction material.

2. Description of the Prior Art

Everyday, thousands of professional contractors embark on a variety of construction and related tasks such as building an addition onto a home, replacing worn shingles from roofs, or installing flooring and countertops. Requiring skill, agility and a good eye, the results achieved by successfully completing these tasks can be enjoyed by clientele such as home and business owners for years. Regardless of whether one is a professional bricklayer, roofer or electrician, most would agree that the most important element in the completion of any work task is tools. Hammers, chisels, screwdrivers and drills are but a few of the manual and electric tools that are invaluable to anyone involved in construction or home improvement tasks. In particular, a jig is a practical tool utilized by contractors and do-it-yourselfers alike. A jig is any of a large class of tools in woodworking, metalworking and various types of crafts that help to control the location, motion or both of a tool. The primary purpose for a jig is for repeatability and exact duplication of a part for reproduction. There are many types of jigs, and each one is custom-tailored to do a specific job. Many jigs are created because there is a necessity to do so by the tradesmen and are thus designed purely to increase productivity, complete repetitious activities and to add precision to a job.

SUMMARY

The present invention is a jig device for accurately measuring an opening when installing shelving, windowsills, molding, and similar construction material. The jig device comprises a first elongated bar and a second elongated bar. First incremental measurements are marked on the first elongated bar with the first incremental markings reading right to left. Second incremental measurements are marked on the second elongated bar with the second incremental markings reading left to right. A first fastening mechanism slidably connects the first elongated bar to the second elongated bar and is tightenable to inhibit movement between the first elongated bar and the second elongated bar. A first angle paddle and a second angle paddle are provided. A second fastening mechanism slidably and rotatably connects the first angle paddle to the first elongated bar and is tightenable to inhibit movement between the first angle paddle and the first elongated bar and a third fastening mechanism slidably and rotatably connects the second angle paddle to the second elongated bar and is tightenable to inhibit movement between the second angle paddle and the second elongated bar. Upon positioning the jig device within an opening with the second sides of the angle paddles rotated and moved along the second and third fastening means and positioned on the outside of the opening, the alignment of a common number on the first incremental measurements and the second incremental measurements indicates a center point for the opening.

BRIEF DESCRIPTION OF THE DRAWINGS

FIG. 1 is a perspective view illustrating a jig device, constructed in accordance with the present invention;

FIG. 2 is another perspective view illustrating the jig device, constructed in accordance with the present invention;

FIG. 3 is still another perspective view illustrating the jig device, constructed in accordance with the present invention;

FIG. 4 is yet another perspective view illustrating the jig device, constructed in accordance with the present invention;

DETAILED DESCRIPTION OF THE PREFERRED EMBODIMENTS

Figure 5:
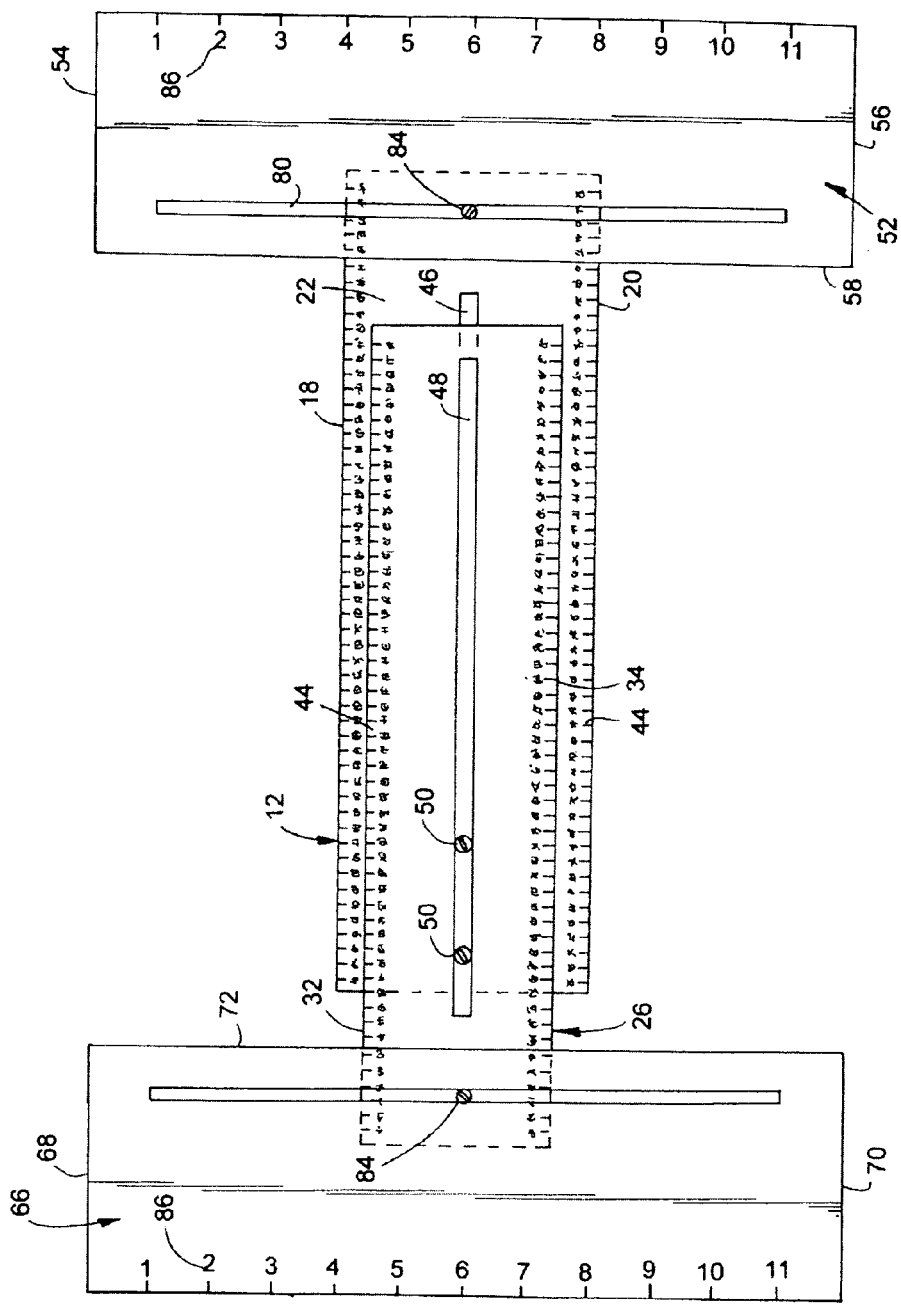
FIG. 5 is a top plan view illustrating the jig device, constructed in accordance with the present invention.
Figure 6:
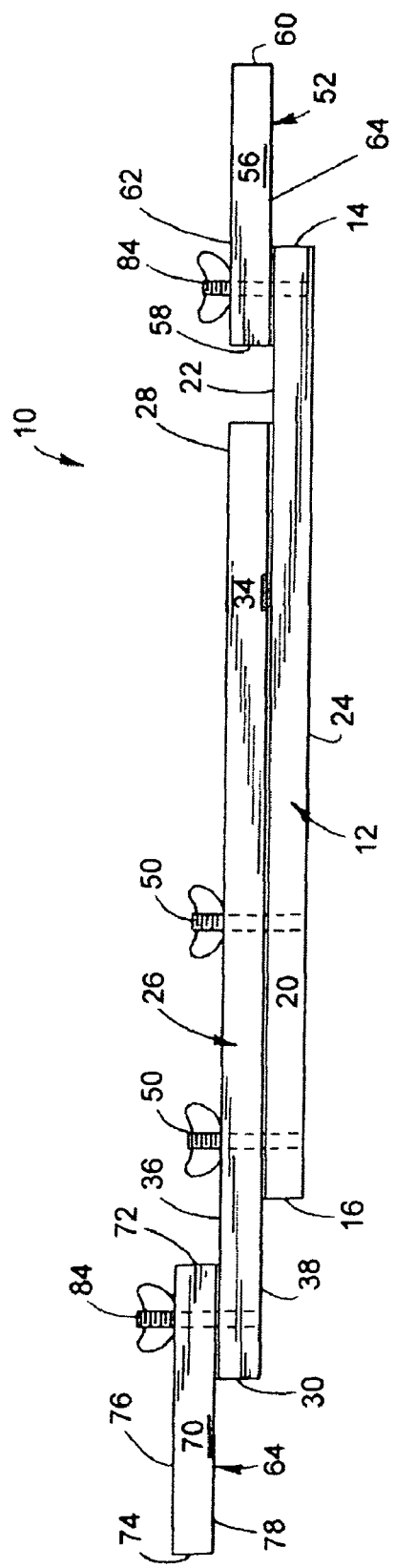
FIG. 6 is an elevational side view illustrating the jig device, constructed in accordance with the present invention.

As illustrated in FIGS. 1-6, the present invention is a jig device, indicated generally at 10, for accurately measuring an opening for installing shelving, windowsills, molding, or similar construction material. The jig device 10 of the present invention accurately measures angled cuts; particularly those that are less than or greater than ninety) (90° degrees. The jig device 10 also simultaneously measures the distance between two angled end pieces, as will be described in further detail below, thus ensuring the entire piece is accurately measured then cut.

The jig device 10 of the present invention has a first elongated bar 12 having a first end 14, a second end 16 substantially opposite the first end 14, a first side 18 between the first end 14 and the second end 16, a second side 20 between the first end 14 and the second end 16 substantially opposite the first side 18, a top surface 22, and a bottom surface 24 substantially opposite the top surface 22 and a second elongated bar 26 having a first end 28, a second end 30 substantially opposite the first end 28, a first side 32 between the first end 28 and the second end 30, a second side 34 between the first end 28 and the second end 30 substantially opposite the first side 32, a top surface 36, and a bottom surface 38 substantially opposite the top surface 36. A first aperture 40 is formed in the first end 14 of the first elongated bar 12 and a second aperture 42 is formed in the second end 30 of the second elongated bar 26, as described in further below.

Both the first elongated bar 12 and the second elongated bar 26 of the jig device 10 of the present invention are marked with incremental measurements 44, similar to a ruler or the like, on the top surfaces 22, 36 along the first sides 18, 32 and the second sides 20, 34. The incremental markings 44 are preferably marked from left to right on the second elongated bar 26 and right to left on the first elongated bar 12.

Preferably, the length of the first elongated bar 12 of the jig device 10 of the present invention is equal to the length of the second elongated bar 26. Also, preferably, the width of the first elongated bar 12 is greater than the width of the second elongated bar 26. It should be noted that the lengths and widths of the first elongated bar 12 and the second elongated bar 26 can be a variety of sizes to accommodate various construction tasks.

The first elongated bar 12 and the second elongated bar 26 of the jig device 10 of the present invention have a first slot 46 and a second slot 48, respectively, running along the length of the first elongated bar 12 and the second elongated bar 26. The first slot 46 and the second slot 48 are preferably centered between the first sides 18, 32 and the second sides 20, 34 of the first elongated bar 12 and the second elongated bar 26, respectively, and extend to a predetermined point prior to the first ends 14, 28 and the second ends 16, 30. When the bottom surface 38 of the second elongated bar 26 is positioned against the top surface 22 of the first elongated bar 12 with the first slot 46 aligned with the second slot 48, the incremental markings 44 on both the first elongated bar 12 and the second elongated bar 26 are visible.

In addition, the jig device 10 of the present invention has a pair of fastening mechanisms 50 extending through the first slot 46 and the second slot 48. The fastening mechanisms 50 are preferably spaced from each other and allow the first elongated bar 12 and the second elongated bar 26 are moveable relative to each other in a longitudinal direction only and then can be releasably secured together to inhibit relative movement. In a preferred embodiment, the fastening mechanisms 50 are a quick cam release device or a bolt and wing nut although using other types of fastening mechanisms 50 are within the scope of the present invention.

The jig device 10 of the present invention further has a first angle paddle 52 having a first end 54, a second end 56 substantially opposite the first end 54, a first side 58 between the first end 54 and the second end 56, a second side 60 between the first end 54 and the second end 56 substantially opposite the first side 58, a top surface 62, and a bottom surface 64 substantially opposite the top surface 62 and a second angle paddle 66 having a first end 68, a second end 70 substantially opposite the first end 68, a first side 72 between the first end 68 and the second end 70, a second side 74 between the first end 68 and the second end 70 substantially opposite the first side 72, a top surface 76, and a bottom surface 78 substantially opposite the top surface 76. The first angle paddle 52 has a first paddle slot 80 and the second angle paddle 66 has a second paddle slot 82 running along the length of the first angle paddle 52 and the second angle paddle 66, respectively. The first paddle slot 80 and the second paddle slot 82 are preferably positioned nearingly adjacent the first sides 58, 72 of the first angle paddle 52 and the second angle paddle 66, respectively, and extend to a predetermined point prior to the first ends 54, 68 and the second ends 56, 70. The first paddle slot 80 is positioned over the first aperture 40 in the first elongated bar 12 and the second paddle slot 82 is positioned over the second aperture 42 in the second elongated bar 26 with a fastening mechanism 84, such as a quick cam release or bolt and wing nut, extending through the apertures 40, 42 and the paddle slots 80, 82, allowing the first angle paddle 52 and the second angle paddle 16, respectively, to rotate about and slide along the fastening mechanism 84.

Preferably, the first angle paddle 52 of the jig device 10 of the present invention has incremental markings 86 along the second side 60 of the first angle paddle 52 reading from left to right. In addition, preferably, the second angle paddle 6 has incremental markings 86 along the second side 74 of the second angle paddle 66 reading from right to left. The reverse markings allow a user to measure from the same point on opposite walls of an opening to get a more accurate reading.

By simply rotating the first angle paddle 52 and the second angle paddle 66 of the jig device 10 of the present invention, precise angles are provided for any given object. The first angle paddle 52 and the second angle paddle 66 are slotted allowing adjustment to the depth of a given opening being measured simply by rotating and sliding the angle paddles 52, 66. Thus, when measuring a shelving unit or windowsill, the user positions the angle paddles 52, 66 accordingly to determine the angle of the end pieces. When the same number of incremental marking 44 on the first elongated bar 12 and the second elongated bar 26 are the same, the user is then able to determine the exact center point for the window or opening.

The first elongated bar 12, the second elongated bar 26, the first angle paddle 52, and/or the second angle paddle 66 of the jig device 10 of the present invention are preferably constructed of a sturdy clear plastic or wooden material although constructing the first elongated bar 12, the second elongated bar 26, the first angle paddle 52, and/or the second angle paddle 66 from other materials is within the scope of the present invention.

The jig device 10 of the present invention offers professional contractors and other users a number of significant benefits and advantages. Foremost, the jig device 10 provides a precision jig tool for use when installing shelving, windowsills, or comparable material, allowing the professional to accurately measure both the corner angles and the distance between the two, simultaneously. Users will especially appreciate that the jig device 10 easily determines the exact center point of a given object thus ensuring an accurate cut. With shelving and sills perfectly measured and accurately cut, these items can be installed in an easier and more sound manner, thus ensuring a task could be executed in a professional manner, with the end result quality constructed. Not limited to use by professional contractors, experienced do-it-yourselfers will also appreciate the many benefits the jig device 10 affords. The jig device 10 provides a precision jig for use in measuring and cutting shelving units, windowsills, and other construction material.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A jig device for accurately measuring an opening when installing shelving, windowsills, molding, and similar construction material, the jig device comprising:

a first elongated bar having a first end, a second end, a first side, a second side, a top surface, and a bottom surface;

a second elongated bar having a first end, a second end, a first side, a second side, a top surface, and a bottom surface;

a first aperture formed in the first end of the first elongated bar;

a second aperture formed in the second end of the second elongated bar;

first incremental measurements marked on the first elongated bar, the first incremental markings reading right to left;

second incremental measurements marked on the second elongated bar, the second incremental markings reading left to right;

a first slot formed in the first elongated bar;

a second slot formed in the second elongated bar;

first fastening means extending through the first slot and the second slot for slidably connecting the first elongated bar to the second elongated bar and tightenable to inhibit movement between the first elongated bar and the second elongated bar;

a first angle paddle having a first end, a second end, a first side, a second side, a top surface, and a bottom surface;

a second angle paddle having a first end, a second end, a first side, a second side, a top surface, and a bottom surface;
a first paddle slot formed in the first angle paddle;
a second paddle slot formed in the second angle paddle;
second fastening means extending through the first aperture and the first paddle slot for slidably and rotatably connecting the first angle paddle to the first elongated bar and tightenable to inhibit movement between the first angle paddle and the first elongated bar; and
third fastening means extending through the second aperture and the second paddle slot for slidably rotatably connecting the second angle paddle to the second elongated bar and tightenable to inhibit movement between the second angle paddle and the second elongated bar;
wherein upon positioning the jig device within an opening with the second sides of the angle paddles rotated and moved along the second and third fastening means and positioned on the outside of the opening, the alignment of a common number on the first incremental measurements and the second incremental measurements indicates a center point for the opening.

2. The jig device of claim 1 wherein the length of the first elongated bar is equal to the length of the second elongated bar.

3. The jig device of claim 1 wherein the width of the first elongated bar is greater than the width of the second elongated bar.

4. The jig device of claim 3 wherein the first slot and the second slot are centered between the first side and the second side of the first elongated bar and the second elongated bar, respectively, and extend to a predetermined point prior to the first end and the second end of the first elongated bar and the second elongated bar, respectively, such that upon the bottom surface of the second elongated bar being positioned against the top surface of the first elongated bar with the first slot aligned with the second slot, the incremental markings on both the first elongated bar and the second elongated bar are visible.

5. The jig device of claim 1 wherein the first fastening means is a pair of spaced first fastening mechanisms, the first elongated bar and the second elongated bar moveable relative to each other in a longitudinal direction only and then releasably securable together to inhibit relative movement.

6. The jig device of claim 1 wherein the first paddle slot and the second paddle slot are positioned nearingly adjacent the first side of the first angle paddle and the second angle paddle, respectively, and extend to a predetermined point prior to the first end and the second end of the first angle paddle and the second angle paddle, respectively.

7. The jig device of claim 1 wherein the second fastening means is a second fastening mechanism allowing the first angle paddle to rotate about and slide along the second fastening mechanism and the third fastening means is a third fastening mechanism allowing the second angle paddle to rotate about and slide along the third fastening mechanism.

8. A jig device for accurately measuring an opening when installing shelving, windowsills, molding, and similar construction material, the jig device comprising:
a first elongated bar having a first end, a second end, a first side, a second side, a top surface, and a bottom surface;
a second elongated bar having a first end, a second end, a first side, a second side, a top surface, and a bottom surface;
first incremental measurements marked on the first elongated bar, the first incremental markings reading right to left;
second incremental measurements marked on the second elongated bar, the second incremental markings reading left to right;
first fastening means for slidably connecting the first elongated bar to the second elongated bar and tightenable to inhibit movement between the first elongated bar and the second elongated bar;
a first angle paddle having a first end, a second end, a first side, a second side, a top surface, and a bottom surface;
a second angle paddle having a first end, a second end, a first side, a second side, a top surface, and a bottom surface;
second fastening means for slidably and rotatably connecting the first angle paddle to the first elongated bar and tightenable to inhibit movement between the first angle paddle and the first elongated bar; and
third fastening means for slidably and rotatably connecting the second angle paddle to the second elongated bar and tightenable to inhibit movement between the second angle paddle and the second elongated bar;
wherein upon positioning the jig device within an opening with the second sides of the angle paddles rotated and moved along the second and third fastening means and positioned on the outside of the opening, the alignment of a common number on the first incremental measurements and the second incremental measurements indicates a center point for the opening.

9. The jig device of claim 8 wherein the width of the first elongated bar is greater than the width of the second elongated bar.

10. The jig device of claim 8 and further comprising:
a first slot formed in the first elongated bar; and
a second slot formed in the second elongated bar;
wherein the first slot and the second slot are centered between the first side and the second side of the first elongated bar and the second elongated bar, respectively, and extend to a predetermined point prior to the first end and the second end of the first elongated bar and the second elongated bar, respectively such that upon the bottom surface of the second elongated bar being positioned against the top surface of the first elongated bar with the first slot aligned with the second slot, the incremental markings on both the first elongated bar and the second elongated bar are visible.

11. The jig device of claim 10 wherein the first fastening means is a pair of spaced first fastening mechanisms extending through the first slot and the second slot, the first elongated bar and the second elongated bar moveable relative to each other in a longitudinal direction only and then releasably securable together to inhibit relative movement.

12. The jig device of claim 8 and further comprising:
a first aperture formed in the first end of the first elongated bar;
a second aperture formed in the second end of the second elongated bar;
a first paddle slot formed in the first angle paddle; and
a second paddle slot formed in the second angle paddle;
wherein the first paddle slot and the second paddle slot are positioned nearingly adjacent the first side of the first angle paddle and the second angle paddle, respectively, and extend to a predetermined point prior to the first end and the second end of the first angle paddle and the second angle paddle, respectively.

13. The jig device of claim 12 wherein the second fastening means is a second fastening mechanism allowing the first angle paddle to rotate about and slide along the second fastening mechanism and the third fastening means is a third fastening mechanism allowing the second angle paddle to rotate about and slide along the third fastening mechanism.

14. A method for accurately measuring an opening when installing shelving, windowsills, molding, and similar construction material, the jig device comprising:

providing a first elongated bar having a first end, a second end, a first side, a second side, a top surface, and a bottom surface;

providing a second elongated bar having a first end, a second end, a first side, a second side, a top surface, and a bottom surface;

marking first incremental measurements on the first elongated bar, the first incremental markings reading right to left;

marking second incremental measurements on the second elongated bar, the second incremental markings reading left to right;

slidably connecting the first elongated bar to the second elongated bar;

inhibiting movement between the first elongated bar and the second elongated bar;

providing a first angle paddle having a first end, a second end, a first side, a second side, a top surface, and a bottom surface;

providing a second angle paddle having a first end, a second end, a first side, a second side, a top surface, and a bottom surface;

slidably and rotatably connecting the first angle paddle to the first elongated bar;

inhibiting movement between the first angle paddle and the first elongated bar;

for slidably and rotatably connecting the second angle paddle to the second elongated bar;

inhibiting movement between the second angle paddle and the second elongated bar;

positioning the jig device within an opening with the second sides of the angle paddles rotated and moved along the second and third fastening means and positioned on the outside of the opening;

aligning a common number on the first incremental measurements and the second incremental measurements; and indicating a center point for the opening.

15. The method of claim 14 wherein the width of the first elongated bar is greater than the width of the second elongated bar.

16. The method of claim 14 and further comprising:
forming a first slot in the first elongated bar;
forming a second slot in the second elongated bar;
centering the first slot and the second slot between the first side and the second side of the first elongated bar and the second elongated bar, respectively;
extending the first slot and the second slot to a predetermined point prior to the first end and the second end of the first elongated bar and the second elongated bar, respectively;
positioning the bottom surface of the second elongated bar against the top surface of the first elongated bar;
aligning the first slot aligned with the second slot; and
visibly viewing the incremental markings on both the first elongated bar and the second elongated bar.

17. The method of claim 16 and further comprising:
extending a pair of spaced first fastening mechanisms through the first slot and the second slot;
moving the first elongated bar and the second elongated bar relative to each other in a longitudinal direction only; and
releasably securing the first elongated bar to the second elongated bar.

18. The method of claim 14 and further comprising:
forming a first aperture in the first end of the first elongated bar;
forming a second aperture in the second end of the second elongated bar;
forming a first paddle slot in the first angle paddle;
forming a second paddle slot in the second angle paddle;
positioning the first paddle slot and the second paddle slot nearingly adjacent the first side of the first angle paddle and the second angle paddle; and
extending the first paddle slot and the second paddle slot to a predetermined point prior to the first end and the second end of the first angle paddle and the second angle paddle, respectively.

19. The method of claim 18 and further comprising:
extending a second fastening mechanism through the first aperture and the first paddle slot;
extending a third fastening mechanism through the second aperture and the second paddle slot;
rotating and sliding the first angle paddle along the second fastening mechanism; and
rotating and sliding the second angle paddle along the third fastening mechanism.

\* \* \* \* \*